United States Patent Office 3,003,465
Patented Oct. 10, 1961

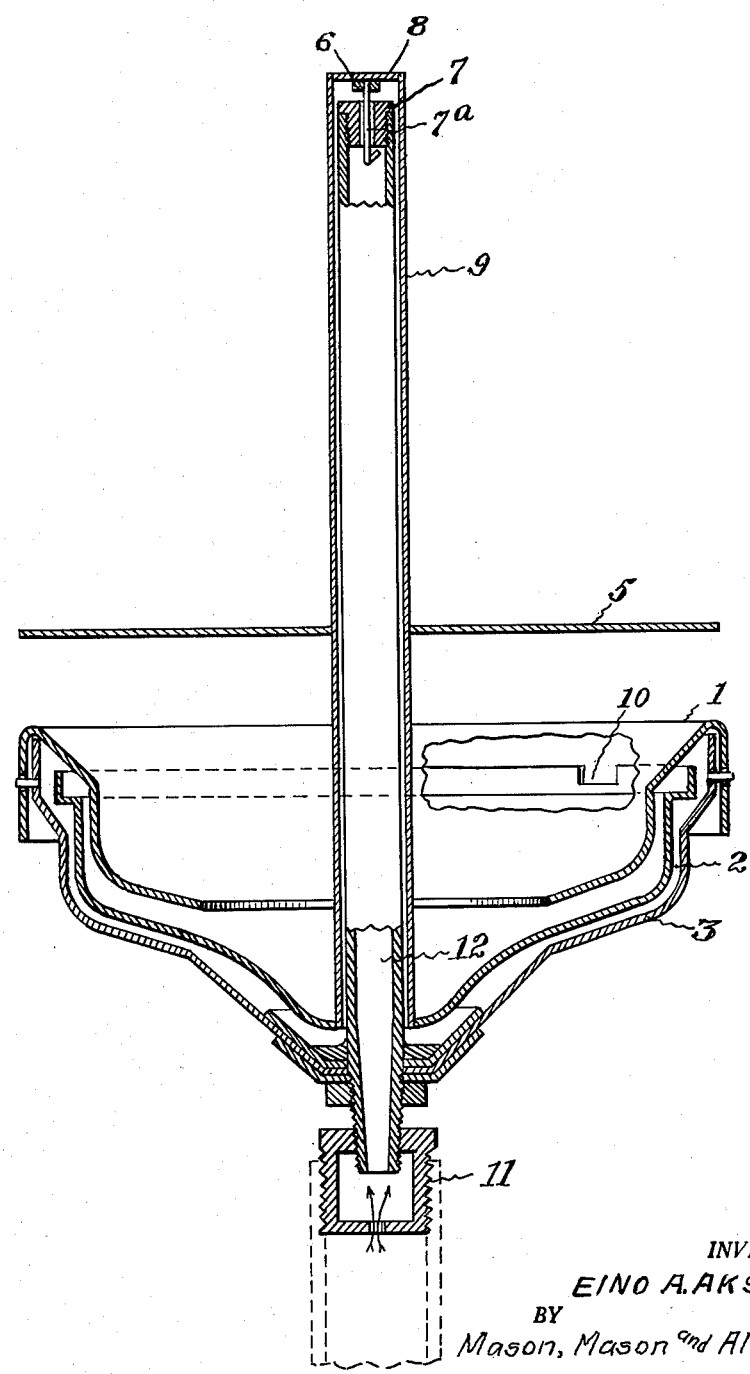

3,003,465
POULTRY WATERER
Eino A. Aksila, Pierce Road, Townsend Harbor,
Townsend, Mass.
Filed Oct. 12, 1959, Ser. No. 846,038
7 Claims. (Cl. 119—81)

This invention has been designed to serve in the same capacity as an ordinary poultry fountain, but several modifications are present in this design that render it far superior to ordinary poultry fountains. In brief, the main improvements present in this fountain are as follows: no moving parts that can wear out, chickens cannot roost on the fountain, and the valve has been designed in such a manner as to be self-cleaning and to prevent any overflooding of water or undersupply of water.

The figure is a central vertical section of the watering device with parts in full lines.

Part 5 is a safety guard. Parts 6 and 7 comprise the valve assembly, shown in the figure. Part 6 is the valve itself having a depending stem 7a, which slides up and down in part 7a, the valve housing.

Except for the valve assembly, all parts of this poultry fountain are made of the same material. This material may be plastic, stainless steel, brass, or any other non-rusting substance. Part 6 is made of a rubber bushing run through by a non-rusting pin, the end of which is bent to prevent the valve from slipping out from part 7. Part 7 can be made as a standardized part (non-rusting metal again) or can be made from a hexagonal bolt, drilled through to allow for the free clearance of the valve, and with the head ground down to a pointed form to allow the rubber bushing to contact it at only one point. As parts are assembled as shown in the exploded view and the cover (part 1) is locked onto the base (part 3) by means of the pins and slots described above.

As shown in the drawings, the part indicated by reference numeral 2 is located between the cover and the base, and is adapted to move in a vertical direction, the construction being such as to allow this vertical movement as the part 2 floats up and down between the cover and the base for the purpose of allowing freedom of vertical movement. The fountain works in the following manner: when the pipe joint is connected to a water pipe and the pressure is turned on, water flows up in the inside of the vertical part of conduit 12 having a top 8 until it reaches the valve assembly. The water pressure will force the valve up, lifting up the weight of part 2 until the inside of the bottom of part 2 touches the bottom of part 1. Then the water will proceed to flow down between parts 2 and 3 until it begins to fill the inside of part 3. The water then fills up the space between the bases of parts 2 and 3 until it begins to flow into the inner bowl of part 2 by means of the four rectangular slots cut into the edge of part 2. As the water fills this inner bowl, it naturally also fills up in part 1, where the poultry drinks from. When the water has reached a level of about halfway in parts 1 and 2 (level is predetermined by the design of the fountain) the weight of the water in part 2 forces the part (control cup) to sink downward, the top of the part pressing the rubber bushing of the valve, and sealing off any further flow of water. As the water is used up by the poultry, the weight of water again decreases in the control cup allowing the water pressure to force more water around through the system back into the control cup, the weight of which again seals off any further flow of water. Thus a continuous water level is maintained in the fountain. Part 5 can be used when the poultry is young to prevent any drownings, and can then be removed as the poultry becomes older. The water level in the cup will vary depending upon the size of the valve opening and the pressure exerted by the water on the valve. Because of the location of the valve, it naturally cannot become clogged by any dirt that might be scratched into the fountain by the poultry. The valve is self-cleaning as water is always flowing through the system gradually.

The tubular member is shown at 9, the same having a top 8. One of the four slots or passageways is indicated by reference numeral 10, the conduit being indicated by reference numeral 12 and the pipe connection being shown at 11.

I claim:
1. A poultry watering device comprising a substantially vertically arranged conduit having a valve at the top thereof, a first bowl surrounding a lower portion of said conduit, a tubular imperforate member surrounding said conduit, a second bowl on the lower end of said tubular member and contained within said first bowl, the top of said tubular member being closed and normally resting on said valve to close the same, whereby when water is in said first bowl and said second bowl is empty the valve will be open, and water will then overflow into said second bowl until the same settles and causes said valve to close.

2. In the combination of claim 1, a third open bottom bowl inside said second bowl and engaging the rim of said first bowl to keep said watering device free from dirt.

3. In the combination of claim 1 wherein said second bowl is provided with passageway means.

4. In the combination of claim 3, said passageway means comprising a plurality of peripheral passages located on said second bowl.

5. In the combination of claim 1 wherein said conduit is located in nested position within said tubular member.

6. In the combination of claim 1, means fixedly attaching said conduit centrally of said bowl, and means for fixedly attaching said tubular member centrally of said second bowl.

7. In the combination of claim 5, a means for sealingly attaching said conduit to said first bowl and said tubular member to said second bowl whereby said second bowl may be floatably supported by the water in said first bowl as the tubular member is vertically guided by said conduit during said second bowl vertical movement.

References Cited in the file of this patent
UNITED STATES PATENTS

| | | |
|---|---|---|
| 1,253,941 | Copeland | Jan. 15, 1918 |
| 2,452,305 | Johnson | Oct. 26, 1948 |
| 2,754,838 | Gates et al. | July 17, 1956 |